United States Patent
Itatani

(10) Patent No.: US 8,742,031 B2
(45) Date of Patent: *Jun. 3, 2014

(54) SOLVENT-SOLUBLE 6,6-POLYIMIDE COPOLYMERS AND PROCESSES FOR PREPARING THEM

(75) Inventor: Hiroshi Itatani, Ushiku (JP)

(73) Assignees: Solpit Industries, Ltd. (JP); Sojitz Corporation (JP)

( * ) Notice: Subject to any disclaimer, the term of this patent is extended or adjusted under 35 U.S.C. 154(b) by 1276 days.

This patent is subject to a terminal disclaimer.

(21) Appl. No.: 12/594,523

(22) PCT Filed: Apr. 3, 2007

(86) PCT No.: PCT/JP2007/057471
§ 371 (c)(1),
(2), (4) Date: Mar. 19, 2010

(87) PCT Pub. No.: WO2008/120398
PCT Pub. Date: Oct. 9, 2008

(65) Prior Publication Data
US 2013/0018167 A1    Jan. 17, 2013

(51) Int. Cl.
*C08G 73/10* (2006.01)

(52) U.S. Cl.
USPC ........... 525/432; 525/431; 525/436; 528/350; 528/353

(58) Field of Classification Search
USPC .................. 525/432, 431, 436; 528/350, 353
See application file for complete search history.

(56) References Cited

U.S. PATENT DOCUMENTS

| | | | |
|---|---|---|---|
| 4,011,297 A | 3/1977 | Nyman et al. | |
| 4,359,572 A | 11/1982 | Umezawa et al. | |
| 5,202,411 A | 4/1993 | Itatani | |
| 5,302,143 A | 4/1994 | Inoue et al. | |
| 5,502,142 A | 3/1996 | Sneddon et al. | |
| 6,627,307 B1 | 9/2003 | Reichert et al. | |
| 6,890,626 B1 | 5/2005 | Itatani et al. | |
| 8,349,971 B2 * | 1/2013 | Itatani | 525/432 |
| 2006/0004180 A1 | 1/2006 | Itatani | |

FOREIGN PATENT DOCUMENTS

| | | |
|---|---|---|
| JP | 10-114824 A | 5/1998 |
| JP | 2002-212287 A | 7/2002 |
| JP | 2003-113338 A | 4/2003 |
| JP | 2003-119285 A | 4/2003 |
| WO | 2006057036 A1 | 6/2006 |

* cited by examiner

*Primary Examiner* — Gregory Listvoyb
(74) *Attorney, Agent, or Firm* — The Webb Law Firm

(57) ABSTRACT

Heat-resistant polyimide copolymers having the following four components: pyromellitic dianhydride (PMDA), 1,4-diaminodiphenyl ether (DADE), biphenyltetracarboxylic dianhydride (BPDA), and 2,4-diaminotoluene (DAT) are provided. In an embodiment the molar ratio of (BPDA):(DADE):(PMDA):(DAT) is 2:2:m:m, in which m is an integer of 3, 4 or 5.

11 Claims, No Drawings

SOLVENT-SOLUBLE 6,6-POLYIMIDE COPOLYMERS AND PROCESSES FOR PREPARING THEM

FIELD OF THE INVENTION

Conventional polyimide films are two-component polycondensates. The present invention relates to solvent-soluble highly heat-resistant polyimides consisting essentially of four components, i.e., pyromellitic dianhydride (hereinafter referred to as PMDA), 4,4'-diaminodiphenyl ether (hereinafter referred to as DADE), biphenyltetracarboxylic dianhydride (hereinafter referred to as BPDA) and 2,4-diaminotoluene (hereinafter referred to as DAT).

Solvent-soluble highly heat-resistant polyimides can also be produced by using benzophenone tetracarboxylic dianhydride (called BTDA) in place of BPDA. Similar solvent-soluble polyimides can also be produced by using 3,5-diaminobenzoic acid (hereinafter referred to as DABz) in place of DAT.

BACKGROUND OF THE INVENTION

A polyimide film serving as a highly heat-resistant resin was first manufactured in 1960 by DuPont and called KAPTON, which consists of pyromellitic dianhydride (PMDA) and 1,4-diaminodiphenyl ether (DADE).

This is a polymer characterized by a glass transition temperature (Tg) of 420° C. and a thermal decomposition onset temperature (Tm) of 500° C. or more as well as high electric insulation, mechanical strength and chemical resistance so that it is widely used as a material for aerospace vehicles, electric/electronic components, semiconductors, etc. (non-patent document 1: polyimides; D. Wilson, H. D. Steinberger, R. M. Morgenrother; Blackie, New York (1990)).

A polyimide film called "Upilex" manufactured by Ube Industries, Ltd. in 1980 is a heat-resistant film consisting of biphenyltetracarboxylic dianhydride (BPDA) and 1,4-diaminobenzene and having Tg>500° C. and Tm>550° C. (non-patent document 1).

Any heat-resistant polyimide film comparable to KAPTON or Upilex has never been produced since. They are solvent-insoluble polyimides, and any tetracarboxylic dianhydride replacing PMDA or BPDA has not been developed.

KAPTON and Upilex are less soluble in organic solvents, and they are polymerized in anhydrous solvents at low temperatures to synthesize a polyamic acid, which is then cast and heated to form a polyimide film.

Polyamic acids readily decompose in water so that they are poor storage stability. Polyamic acids are difficult to modify because they undergo rapid exchange interaction to form random copolymers when other components are added.

It has been known that a tetracarboxylic dianhydride and an aromatic diamine are polycondensed by heating in an organic polar solvent to directly produce a polyimide (patent document 1: H. Itatani, U.S. Pat. No. 5,202,411 (1993), U.S. Pat. No. 6,627,307 B1 (2003), U.S. Pat. No. 6,890,626 B1 (1995)).

Toluene sulfonic acid was used as a catalyst (patent document 2: A. Berger, U.S. Pat. No. 4,011,297 (1979), U.S. Pat. No. 4,359,572 (1983)).

When a polyimide is synthesized in the presence of an acid catalyst, however, the catalyst must be separated from the polyimide because the presence of the catalyst in the film may cause deterioration.

SUMMARY OF THE INVENTION

Polyimide copolymers consisting of PMDA and DADE are less soluble in solvents. We tried to synthesize a four-component polyimide copolymers consisting of PMDA-DADE-BPDA-DAT by sequential reactions in solution using an acid catalyst, but any solvent-soluble polyimide copolymer could not be obtained. Solvent-soluble four-component polyimides (polyimides consisting of PMDA-DADE-BPDA-DAT) were synthesized via specific imide oligomer intermediates by adopting a novel three-step polycondensation process.

The first step of polycondensation reaction involves reacting 1 mole of BPDA and 2 moles of DADE (component containing 6 benzene rings) to form an imide oligomer, and the second step reaction involves reacting 4 moles of PMDA and 2 moles of DAT (component containing 6 benzene rings) to synthesize a primary intermediate (called 6,6-polyimide oligomer). Finally, the remaining components are added to complete polycondensation. Thus, the present invention mainly provides the following two types of polyamides.

(i) Polyamides having a (BPDA):(DADE):(PMDA):(DAT) molar ratio of 2:2:m:m (where m is an integer of 3, 4 or 5).

(ii) Polyamides having a (BTDA):(DADE):(PMDA):(DAT) molar ratio of 2:2:m:m (where m is an integer of 3, 4 or 5.).

DESCRIPTION OF THE PREFERRED EMBODIMENTS

The endpoint of the reaction is determined by measuring the molecular weight by GPC. The thermal decomposition onset temperature was 500° C. or more, and no glass transition temperature was observed in a test range up to 430° C. Four-component solvent-soluble polyimides are produced by using DABz in place of DAT (variation of (i) or (ii) above). Thermal analysis shows that a weight loss began around 430° C., and that the thermal decomposition onset temperature rose to 540° C.

In order to synthesize a solvent-soluble polyimide, it was necessary to develop a novel catalyst above all things. A catalyst acting as a catalyst during polycondensation reaction and disappearing at the end of the reaction was developed (patent document 3: Y. Oie, H. Itatani, U.S. Pat. No. 5,502,142 (1996)).

A catalyst based on lactone equilibrium was developed. It consists of a mixture of γ-valerolactone and pyridine or γ-valerolactone and N-methylmorpholine, which achieves equilibrium by forming an [acid][base] system in the presence of water and returns to [lactone] and [base] when water is removed from the system (formula 1).

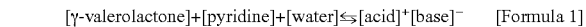

$$[\gamma\text{-valerolactone}]+[\text{pyridine}]+[\text{water}] \leftrightarrows [\text{acid}]^+[\text{base}]^-  \quad [\text{Formula 1}]$$

Imidation reaction takes place by adding small amounts of γ-valerolactone and pyridine or γ-valerolactone and N-methylmorpholine into the reaction system, and heating it at 180° C.

$[\text{Acid}]^+[\text{base}]^-$ is produced by the [water] generated at an early step of the reaction to promote the imidation reaction. The water produced during the reaction is removed from the reaction system by azeotropic distillation with toluene contained in the system. When the imidation reaction is completed, the reaction system approaches an anhydrous state and the $[\text{acid}]^+[\text{base}]^-$ is separated into [γ-valerolactone] and [pyridine] and removed from the system. Thus, a high-purity polyimide copolymer is obtained.

Solvent-soluble multicomponent block-copolymerized polyimides are produced by sequential polycondensation reactions. Four-component block-copolymerized polyimides are produced by the formula below:

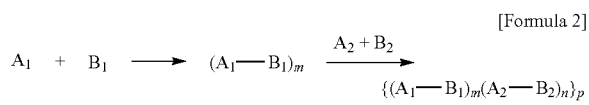

[Formula 2]

where $A_1$ and $A_2$ represent acid dianhydrides, and $B_1$ and $B_2$ represent aromatic diamines.

During such sequential reactions, four-component block-copolymerized polyimides containing PMDA and DADE precipitated and failed to give solvent-soluble polyimides.

The PMDA-DADE-PMDA component and DADE-PMDA-DADE component are less soluble in solvents. Thus, it was necessary to synthesize block copolymerized polyimides free from these insoluble components.

We developed a novel polycondensation reaction based on three-step addition for generating a specific component rather than sequential polycondensation reactions. As a result, we succeeded in synthesizing solvent-soluble four-component polyimides consisting of PMDA-DADE-BPDA-DAT.

[Applications of 6,6-polyimide copolymers]

6,6-polyimide copolymers are solvent-soluble polyimide resins showing good storage stability. They can be coated on metal surfaces to form composite materials or used in copper substrates. Modified polyimides can be used for electrodeposition or as adhesives.

They can be cast/heated into films, which can be widely used as highly heat-resistant films in electric/electronic components, transport aircraft materials, semiconductor materials, etc.

They can be used as medical materials, construction materials, high-temperature materials for domestic uses (e.g., iron soleplates, inner walls of pans, inner walls of microwave ovens), substitutes for Teflon™ by capitalizing on advantages of the new preparation process, high performance quality and low-cost products.

Polyimides consisting of combinations of aPMDA+ bBPDA+cDADE+dDAT (where a, b, c, and d denote the number of moles) have the stoichiometry shown by the formula below:

$a+b=c+d$ (the number of moles)  [Formula 3]

Taking into consideration the availability of materials, product costs, etc., the following conditions $$\frac{a(PMDA)}{b(BPDA)} \geq 1, \frac{d(DAT)}{c(DADE)} \geq 1, \frac{a(PMDA)}{d(DAT)} \geq 1$$  [Formula 4]

were established:

In solutions in organic polar solvents (N-methylpyrrolidone, dimethylacetamide, sulfolane, dimethylformamide) were added γ-valerolactone and pyridine or γ-valerolactone and N-methylmorpholine, and the production reactions of polyimides containing the four components above were evaluated.

As a result of the evaluation of various polycondensation reactions based on three-step addition, desired solvent-soluble polyimides were obtained by a polyimide synthesis process through primary polycondensates showing specific compositions.

I. Polyimides having a (BPDA):(DADE):(PMDA):(DAT) Molar Ratio of 2:2:m:m (Where m is an Integer of 3, 4 or 5.).

I-1. Polyimides having a (BPDA):(DADE):(PMDA): (DAT) Molar Ratio of 2:2:4:4

The first step polycondensation reaction is an imidation reaction in which 2 moles of DADE and 1 mole of BPDA are heated at 180° C. in an organic polar solvent in the presence of an acid catalyst to produce an oligomer having diamine at both ends (formula 5). The water produced during the reaction is removed from the system by azeotropic distillation with toluene.

2DADE+BPDA→(DADE-BPDA-DADE) oligomer  [Formula 5]

In the second step reaction, 4 moles of PMDA and 2 moles of DAT are added and the mixture is stirred. An oligomer having PMDA at both ends is produced (formula 6).

[Formula 6]

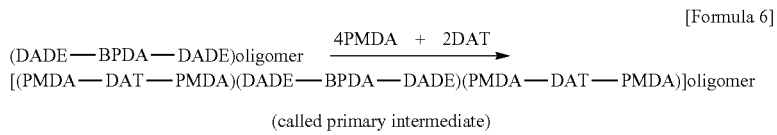

(called primary intermediate)

This primary intermediate is stirred with the remaining mixture (BPDA+2DAT), and the combined mixture is polycondensed by heating to 180° C. to synthesize a solvent-soluble polyimide copolymer (formula 7).

[Primary product][(DAT-BPDA-DAT)]$_n$polyimide  [Formula 7]

The primary intermediate oligomer is a reaction product of components each containing 6 benzene rings in the first step reaction and the second step reaction (formula 8).

[Formula 8]

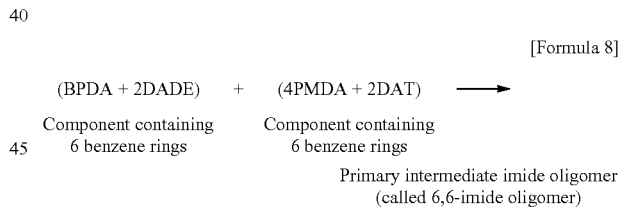

Primary intermediate imide oligomer (called 6,6-imide oligomer)

The primary intermediate oligomer is called 6,6-polyimide to distinguish it from other polyimide products because the components added for the first step reaction and the second step reaction each contain 6 benzene rings.

I-2. Polyimides having a (BPDA):(DADE):(PMDA): (DAT) Molar Ratio of 2:2:5:5

In the first and second step reactions, a 6,6-imide segment is generated, which is combined with a (BPDA+PMDA+ 3DAT) component and heated with stirring to give a solvent-soluble polyimide copolymer in the third step.

Thus, the first step reaction involves reacting a (BPDA+ 2DADE) component at 180° C. for 1 hour in an organic solvent in the presence of a catalyst. Then, the second step reaction involves adding a (4PMDA+2DAT) component at room temperature and stirring the mixture to produce a 6,6-imide segment (BPDA+2DADE) (4PMDA+2DAT).

A (BPDA+PMDA+3DAT) component is added to this solution, and the mixture is heated at 180° C. with stirring to give a solvent-soluble polyimide copolymer.

I-3. Polyimide having a (BPDA):(DADE):(PMDA):(DAT) Molar Ratio of 2:2:3:3

In the three-step addition reaction, PMDA is partially replaced by BPDA. The first step reaction involves reacting a (BPDA+2DADE) component in an organic solvent at 180° C. for 1 hour to produce an imide oligomer.

In the second step reaction, a (3PMDA+BPDA+2DAT) component is added and the mixture is stirred at room temperature to give a primary imide segment (formula 9):

(BPDA+2DADE)(3PMDE+BPDA+2DAT); (imide segment)   [Formula 9]

DAT is added to this solution, and the mixture is heated at 180° C. with stirring to give a polyimide copolymer.

The product is represented by the formula below:

(BPDA+2DADE)(3PMDA+BPDA+2DAT)(DAT)   [Formula 10]

In the Examples below, a variation thereof is represented by the formula below:

(BPDA+2DADE)(3PMDA+BPDA)(3DAT)   [Formula 11]

In this manner, polyimide copolymers having a (BPDA):(DADE):(PMDA):(DAT) molar ratio of 2:2:m:m (where m is an integer of 3, 4 or 5.) are obtained. As shown in the table of physical properties of polyimides, a part of each polyimide solution was cast on a glass plate and heated in an IR heater at 90° C. for 1 hour and 210° C. for 1 hour into a polyimide film, which was then tested by thermal analysis.

The thermal decomposition onset temperature was 500° C. or more, and no glass transition temperature could be observed in a test range up to 430° C.

II. Polyimides having a (BTDA):(DADE):(PMDA):(DAT) Molar Ratio of 2:2:m:m (Where m is an Integer of 3, 4 or 5.)

Solvent-soluble polyimides having similar compositions are produced by using benzophenone tetracarboxylic dianhydride (BTDA) in place of BPDA in the synthetic reaction.

Thus, polyimides having a (BTDA):(DADE):(PMDA):(DAT) of molar ratio 2:2:m:m (where m is an integer of 3, 4 or 5.) are produced.

Thermal analysis of these polyimides showed $T_m$ of 500° C. or more and no $T_g$ in a test range up to 430° C.

Polyimides using BTDA in place of BPDA show higher $M_W$ (weight average molecular weight)/$M_N$ (number average molecular weight) ratios, suggesting that they are partially crosslinked. They can be used as copper substrates or composite polyimide materials because of their good adhesiveness.

Diaminotoluene having the structure below:

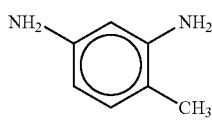

[Chemical Formula 1]

and 3,5-diaminoacetic acid having the structure below:

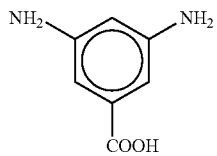

[Chemical Formula 2]

are both derivatives of 1,3-phenylenediamine. Thus, changes in physical properties of copolymerized polyimides in which diaminotoluene is partially replaced by 3,5-diaminoacetic acid were evaluated.

III. Use of 3,5-diaminoacetic acid (DABz) in Place of DAT in the Synthetic Reactions of the (PMDA-DADE-BPDA-DAT) Series and (PMDA-DADE-BTDA-DAT) Series of Polyimides DAT can be replaced by 3,5-diaminoacetic acid (DABz) in the synthetic reactions of the (PMDA-DADE-BPDA-DAT) series and (PMDA-DADE-BTDA-DAT) series of polyimides using similar experimental procedures.

As shown in the Examples below, various methods can be selected, e.g., DAT in the second step may be replaced by DABz or DAT in the third step may be replaced by DABz. Thermal analysis shows a weight loss around 440-450° C. in DABz-containing polyimide copolymers, i.e., (PMDA-DADE-BPDA-DABz) and (PMDA-DADE-BTDA-DABz) systems. This suggests that decarbonation reaction occurs.

As a result, $T_m$ rose to 530-550° C. This series of polyimide copolymers can be used as polyimide coatings by cathodic electrodeposition. They can also be used as composite materials because of their good adhesiveness.

IV. The Results of Molecular Weight Analysis by GPC and Thermal Analysis (TG-DTA Analysis) of the (PMDA-DADE-BPDA-DAT) Series, (PMDA-DADE-BTDA-DAT) Series, (PMDA-DADE-BPDA-DABz) Series, and (PMDA-DADE-BTDA-DABz) Series of Polyimide Copolymers are Shown in Table 1.

The molecular weights of DABz-containing polyimide copolymers could not be determined by GPC in dimethylformamide.

The methyl group of diaminotoluene is adjacent to an amino group to cause molecular distortion when a polyimide bond is formed. This results in inhibition of the resonant effect of the polyimide, thereby further increasing instability. The thermal decomposition onset temperature around 500° C. seems to be mainly attributed to this DAT factor.

When DAT is partially replaced by DABz, the carboxyl group is away from the amino group and does not cause steric distortion of the polyimide. Thus, the polyimide is stabilized by the resonant effect. Moreover, the weight loss around 450° C. may be attributed to this carboxyl group. Thus, the polyimide has the "Upilex" type structure, and seems to show a high thermal decomposition onset temperature.

TABLE 1

Thermal analysis (TG-DTA) and molecular weight analysis (GPC) of four-component polyimides

| Example | Polyimide composition | (TG-DTA) Initial weight loss | $T_m$ | (DSC) $T_g$ | GPC $M_W$ | $M_N$ | $M_W/M_N$ |
|---|---|---|---|---|---|---|---|
| Example 1 | (BPDA):(DADE): (PMDA):(DAT) = 2:2:4:4 | | 512.5° C. | ND | 101.430 | 33.470 | 3.03 |

TABLE 1-continued

Thermal analysis (TG-DTA) and molecular weight analysis (GPC) of four-component polyimides

| Example | Polyimide composition | (TG-DTA) Initial weight loss | $T_m$ | (DSC) $T_g$ | GPC $M_W$ | $M_N$ | $M_W/M_N$ |
|---|---|---|---|---|---|---|---|
| Example 2 | (BPDA):(DADE): (PMDA):(DAT) = 2:2:5:5 | | 506.6° C. | ND | 66.900 | 10.300 | 6.5 |
| Reference Example 3 | (BPDA):(DADE): (PMDA):(DAT) = 2:2:3:3 | | 510.7° C. | ND | | | |
| Example 4 | (BTDA):(DADE): (PMDA):(DAT) = 2:2:4:4 | | 509.5° C. | ND | 117.800 | 12.300 | 9.6 |
| Example 5 | (BTDA):(DADE): (PMDA):(DAT) = 2:2:5:5 | | 506.6° C. | ND | 85.800 | 6.770 | 12.7 |
| Example 6 | (BTDA):(DADE): (PMDA):(DAT) = 2:2:3:3 | | 505.7° C. | ND | 288.400 | 97.000 | 29.7 |
| Example 7 | (BPDA):(DADE):(PMDA): (DABz):(DAT) = 2:2:4:2:2 | 450° C. | 544.4° C. | ND | | | |
| Example 8 | (BPDA):(DADE):(PMDA): (DAT):(DABz) = 2:2:4:2:2 | 445° C. | 534.5° C. | ND | | | |
| Example 9 | (BPDA):(DADE):(PMDA): (DAT):(PMDA): (DABz) = 2:2:4:3:1:2 | 458.3° C. | 553.6° C. | ND | | | |
| Example 10 | (BTDA):(DADE):(PMDA): (DABz):(DAT) = 2:2:4:2:2 | 445° C. | 536.3° C. | ND | | | |

Characteristics of 6,6-polyimide films and PMDA-DADE films are compared.

(A) Characteristics of 6,6-polyimides

A-1 They consist of PMDA-DADE-BPDA-DAT or PMDA-DADE-BTDA-DAT (or DABz in place of DAT) copolymers soluble in solvents.

A-2 They are obtained by direct imidation by acid-catalyzed dehydration-polycondensation reaction.

A-3 They are synthesized via 6,6-imide segments synthesized by a three-step polycondensation reaction.

A-4 The reaction can be performed in 0.1% aqueous solvents and the endpoint of the reaction is determined by molecular weight analysis by GPC with high reproducibility.

A-5 The imide copolymers rapidly form films at lower temperatures. The films show $T_m$>500° C., and $T_g$ cannot be observed in a range up to 430° C.

A-6 They can be modified by partially changing components.

A-7 The polyimide copolymers are stable at room temperature for a long period so that they have good storage stability.

(B) PMDA-DADE Polyimides

B-1 Two-component systems consisting of PMDA-DADE and less soluble in solvents.

B-2 Precursor polyamic acids are synthesized by addition polymerization at low temperatures in anhydrous solvents.

B-3 The polyimides are produced by heating/dehydration reaction of the polyamic acids. Polyamic acids readily decompose in water.

B-4 The reaction takes place in anhydrous solvents. The molecular weights of the polyamic acids cannot be determined because they undergo intermolecular exchange interaction. The endpoint of the reaction is determined by viscosity.

B-5 Films are formed slowly at higher temperatures because film formation involves desolvation and dehydration reactions in combination. Films show Tm>500° C., Tg=420° C.

B-6 They are difficult to modify because random copolymers are formed by intermolecular exchange interactions when components are partially changed.

B7 Polyamic acid solutions are poor in storage stability, and their storage life is 1-2 months even when they are frozen.

EXAMPLES

The following examples illustrate the present invention, including PMDA-DADE-BPDA-DAT copolymers, PMDA-DADE-BTDA-DAT copolymers and 6,6-polyimide copolymers using DABz in place of DAT. However, the present invention is not limited solely to these examples These copolymers were instrumentally analyzed. The molecular weight and molecular weight distribution were determined by high-speed liquid chromatography (GPC; HLC-8120GPCC (available from Tosoh Corporation)) in the polyimide solutions shown in the Examples partially diluted with dimethylformamide. Number average molecular weight ($M_n$), weight average molecular weight ($M_w$) and $M_w/M_n$ are shown.

Thermal analysis was performed on the film obtained by casting a part of each polyimide solution on a glass plate and drying it at 90° C. for one hour and at 210° C. for one hour.

Thermal decomposition onset temperature (Tm) was measured using (TGA-GTA) Thermo Plus Tg 8120 (available from Rigaku Denki Co., Ltd.) by heating to 600° C. at a rate of 10° C./min.

Glass transition temperature (Tg) was measured using DSC Perkin Elmer PYRIS Diameter DSC by heating to 400° C. at a rate of 10° C./min, then air-cooling and heating again to 430° C. at a rate of 10° C./min.

Example 1

Preparation of a Polyimide having a (BPDA):(DADE):(PMDA):(DAT) Molar Ratio of 2:2:4:4

A three-necked separable glass flask equipped with a stainless steel anchor stirrer was connected to an Allihn condenser bearing a water trap. The flask was heated in a silicone oil bath with stirring under a stream of nitrogen gas.

The three-necked separable flask was charged with 5.88 g (20 mmol) of 3,4,3',4'-biphenyltetracarboxylic dianhydride (hereinafter referred to as BPDA), 8.01 g (40 mmol) of 4,4'-diaminodiphenyl ether (hereinafter referred to as DADE), 1.5 g (15 mmol) of γ-valerolactone, 3.5 g (44 mmol) of pyridine, 150 g of N-methylpyrrolidone (hereinafter referred to as NMP), and 45 g of toluene. The flask was heated in a silicone bath at a temperature of 180° C. with stirring at 180 rpm for 1 hour under nitrogen. A 20 ml water-toluene fraction was removed.

The flask was air-cooled with stirring at 180 rpm for 1 hour. Then, 17.45 g (80 mmol) of pyromellitic dianhydride (hereinafter referred to as PMDA), 4.88 g (40 mmol) of diaminotoluene (hereinafter referred to as DAT) and 250 g of NMP were successively added, and the flask was stirred at 180 rpm at room temperature for 20 minutes under nitrogen.

Then, 5.88 g (20 mmol) of BPDA, 4.88 g (40 mmol) of DAT, 120 g of NMP, and 30 g of toluene were added, and the flask was stirred at 230 rpm for 30 minutes, then stirred at 180 rpm in a silicone bath at 180° C. Twenty ml of toluene was removed. The mixture was reacted at 180° C., 180 rpm for 5 hours and 10 minutes to give a polyimide solution having a concentration of 10% by weight.

A part of the reaction solution was diluted with dimethylformamide and the molecular weight and molecular weight distribution were determined by high-speed liquid chromatography (HL (8120 GPC) available from Tosoh Corporation). The results showed a number average molecular weight ($M_n$) of 33.470, a weight average molecular weight ($M_w$) of 101.430, a Z-average molecular weight of 178,642, and $M_w/M_n$ of 3.03 (Mz), expressed as polyethylene.

A part of the dried polyimide film was tested for decomposition onset temperature (Tm) in a thermal analyzer from Rigaku Corporation (Thermo Plus Tg 8120) by heating to 600° C. at a rate of 10° C./min. The Tm was 512.5° C.

The glass transition temperature (Tg) was determined using Perkin Elmer Pyrid Diameter DSC by heating to 400° C. at a rate of 10° C./min. Then, the film was air-cooled and heated again to 430° C. at a rate of 10° C./min. No Tg was observed.

Example 2

Preparation of a Polyimide having a (BPDA):(DADE):(PMDA):(DAT) Molar Ratio of 2:2:5:5

The title polyimide copolymer was synthesized in the same manner as described in Example 1.

A flask was charged with 2.9 g (10 mmol) of BPDA, 4.00 g (20 mmol) of DADE, 1.5 g of γ-valerolactone, 2.8 g of pyridine, 100 g of NMP, and 35 g of toluene. The flask was stirred at 180 rpm in a silicone bath at 180° C. for 1 hour under a stream of nitrogen gas. The silicone bath was removed and the flask was air-cooled for 30 minutes, after which 8.73 g (40 mmol) of PMDA, and 2.44 g (20 mmol) of DAT were added followed by 75 g of NMP, and the mixture was stirred at room temperature for 20 minutes. Then, 2.18 g (10 mmol) of PMDA, 2.94 g (10 mmol) of BPDA, and 3.66 g (30 mmol) DAT were added, followed by 72 g of NMP. The mixture was heated at 180° C. with stirring at 180 rpm under a stream of nitrogen gas for 4 hours and 30 minutes. The resulting polyimide solution having a concentration of 10% was analyzed for molecular weight by GPC.

The results showed Mn 10.300, Mw 66.900, and Mw/Mn=6.5.

Thermal analysis was performed. Tm was 506.6° C. Tg was not observed in a test range up to 430° C.

Reference Example 1

Preparation of a Polyimide having a (BPDA):(DADE):(PMDA):(DAT) Molar Ratio of 2:2:3:3

The title copolymer was synthesized in the same manner as described in Example 1.

A reactor was charged with 5.88 g (20 mmol) of BPDA, 8.00 g (40 mmol) of DADE, 1.5 g of γ-valerolactone, 3.0 g of pyridine, 150 g of NMP, and 30 g of toluene. The reactor was heated in a silicone bath at 180° C. with stirring at 180 rpm for 1 hour. After air-cooling for 30 minutes, 13.10 g (60 mmol) of PMDA and 100 g of NMP were added, and the mixture was stirred at 180 rpm at room temperature, after which 5.88 g (20 mmol) of BPDA, 7.32 g (60 mmol) of DAT and 112 g of NMP were added. The mixture was stirred at room temperature for 30 minutes and then heated at 180° C. with stirring at 180 rpm for 4 hours and 35 minutes to give a solution of the title polyimide having a concentration of 10%.

The reaction solution was diluted with dimethylformamide and analyzed by GPC, but the molecular weight could not be determined.

Thermal analysis showed a thermal decomposition onset temperature (Tm) of 510.7° C. No Tg could be observed by DSC in a test range up to 430° C.

Example 4

Preparation of a Polyimide Copolymer having a (BTDA):(DADE):(PMDA):(DAT) Molar Ratio of 2:2:4:4

A procedure similar to that of Example 1 was performed except that benzophenone tetracarboxylic dianhydride (BTDA) was used in place of BPDA.

A three-necked separable glass flask equipped with a stainless steel anchor stirrer was connected to an Allihn condenser bearing a water trap. The flask was heated in a silicone oil bath with stirring under a stream of nitrogen gas.

The flask was charged with 6.44 g (20 mmol) of BTDA, 8.0 g (40 mmol) of DADE, 1.8 g of γ-valerolactone, 3.2 g of pyridine, 150 g of NPM, and 52 g of toluene. After stirring at 180 rpm for 30 minutes at room temperature, the reactor was heated in a silicone bath at 180° C. with stirring at 180 rpm for 1 hour. The silicone bath was removed and the mixture was air-cooled for 30 minutes, and then stirred with 17.44 g (80 mmol) of PMDA, 44.88 g (40 mmol) of DAT, and 100 g of NMP for 15 minutes, and then 6.44 g (20 mmol) of BTDA and 4.88 g (40 mmol) of DAT were added with stirring followed by 103 g of NMP.

The mixture was heated at 180° C. with stirring at 180 rpm for 3 hours and 20 minutes to give a polyimide solution having a concentration of 12%.

The molecular weight expressed as polyethylene by GPC analysis showed $M_n$ 12.300, $M_w$ 117.800 and $M_w/M_n$=9.6.

Thermal analysis by TG-GTA revealed a thermal decomposition onset temperature (Tm) of 509.5° C., but Tg was not observed by DSC analysis in a test range up to 430° C.

Example 5

Preparation of a Polyimide Copolymer having a (BTDA):(DADE):(PMDA):(DAT) Molar Ratio of 2:2:5:5

A procedure similar to that of Example 4 was performed. A three-necked separable flask was charged with 3.22 g (10 mmol) of BTDA, 4.00 g (20 mmol) of DADE, 0.9 g of γ-valerolactone, 1.8 g of pyridine, 80 g of NMP, and 30 g of toluene. The flask was stirred at room temperature for 30 minutes under a stream of nitrogen gas. Then, the reactor was heated in a silicone bath at 180° C. with stirring at 180 rpm for 1 hour under a stream of nitrogen gas. The silicone bath was removed and the mixture was air-cooled for 20 minutes, and then stirred with 8.72 g (40 mmol) of PMDA, 2.44 g (20 mmol) of DAT, and 100 g of NMP at room temperature for 30 minutes, then 3.22 g (10 mmol) of BTDA, 2.18 g (10 mmol) of PMDA, 3.66 g (30 mmol) of DAT and 67 g of NMP were added and the mixture was heated at 180° C. with stirring at 180 rpm for 4 hours and 30 minutes to give a polyimide solution having a concentration of 10%.

A part of the reaction solution was sampled and analyzed for the molecular weight expressed as polyethylene.

The results showed a number average molecular weight ($M_n$) of 6.770, a weight average molecular weight ($M_w$) of 85.800, and $M_w/M_n$ of 12.7. Thermal analysis showed a thermal decomposition onset temperature (Tm) of 506.6° C. No glass transition temperature (Tg) was observed by DSC analysis in a test range up to 430° C.

Example 6

Preparation of a Polyimide Copolymer having a (BTDA):(DADE):(PMDA):(DAT) Molar Ratio of 2:2:3:3

A procedure similar to that of Example 4 was performed.

A three-necked flask was charged with 6.44 g (20 mmol) of BTDA, 8.00 g (40 mmol) of DADE, 1.5 g of γ-valerolactone, 3.0 g of pyridine, 150 g of NMP, and 30 g of toluene. The flask was stirred at 180 rpm for 30 minutes at room temperature, and then heated at 180° C. with stirring at 180 rpm for 1 hour. Twenty ml of toluene was removed. The flask was air-cooled for 25 minutes, and then stirred with 13.10 g (60 mmol) of PMDA and 100 g of NMP at room temperature for 25 minutes, and 6.44 g (20 mmol) of BTDA, 7.32 g (60 mmol) of DAT, and 122 g of NMP were added, and the mixture was heated at 180° C. with stirring at 180 rpm for 4 hours and 35 minutes to give a polyimide solution having a concentration of 10%.

A part of the reaction solution was sampled and analyzed for molecular weight by GPC.

The results showed a number average molecular weight ($M_n$) of 97.000, a weight average molecular weight ($M_w$) of 288.400 and $M_w/M_n$ of 29.8.

Thermal analysis of the polyimide film showed a thermal decomposition onset temperature of 505.7° C. No glass transition temperature could be observed in a test range up to 430° C.

Example 7

Preparation of a of Polyimide Copolymer having a (BPDA):(DADE):(PMDA):(DABz):(DAT) Molar Ratio of 2:2:4:2:2

A procedure similar to that of Example 1 was performed except that DAT was partially replaced by DABz to prepare the polyimide copolymer.

A reactor was charged with 2.94 g (10 mmol) of BPDA, 4.0 g (20 mmol) of DADE, 0.9 g of γ-valerolactone, 1.8 g of pyridine, 100 g of NMP, and 30 g of toluene. The reactor was heated at 180° C. with stirring at 180 rpm for 1 hour. The reactor was stirred at room temperature for 30 minutes, and then stirred with 8.72 g (40 mmol) of PMDA at 200 rpm for 30 minutes at room temperature, then with 3.04 g (20 mmol) of DABz and 83 g of NMP at 180 rpm for 1 hour. Then, 2.94 g (10 mmol) of BPDA and 2.44 g (20 mmol) of DAT were added, followed by 34 g of NMP and 20 g of toluene, and the mixture was stirred at room temperature for 30 minutes, and then reacted in a silicone bath at 180° C. at 180 rpm for 4 hours and 30 minutes to give a polyimide solution having a concentration of 10%.

A sample of the solution diluted in a DMF solution was analyzed for molecular weight, but no corresponding absorption was obtained.

The film was subjected to thermal analysis by TGA-GTA. The temperature was raised to 600° C. at a rate of 10° C./min. A weight loss was observed at 450° C. The thermal decomposition onset temperature ($T_m$) was 544.4° C.

Example 8

Preparation of a Polyimide Copolymer having a (BPDA):(DADE):(PMDA):(DAT):(DABz) Molar Ratio of 2:2:4:2:2

A procedure similar to that of Example 7 was performed.

A reactor was charged with 2.94 g (10 mmol) of BPDA, 4.0 g (20 mmol) of DADE, 0.9 g of γ-valerolactone, 1.8 g of pyridine, 100 g of NMP, and 30 g of toluene. The reactor was stirred at room temperature, then heated in a silicone bath. The reactor was heated at 180° C. with stirring at 180 rpm for 1 hour, and air-cooled for 30 minutes. The mixture was stirred with 4.82 g (40 mmol) of PMDA, 2.44 g (20 mmol) of DAT, and 83 g of NMP at 180 rpm for 1 hour. Then, the mixture was stirred with 2.94 g (10 mmol) of BPDA, 3.04 g (20 mmol) of DABz, and 34 g of NMP at room temperature for 30 minutes, and then heated in a silicone bath at 180° C. with stirring at 180 rpm for 3 hours and 30 minutes. A polyimide solution having a concentration of 10% was obtained.

GPC analysis was tried, but no molecular weight could be determined.

The film was subjected to thermal analysis by TG-GTA, showing a weight loss at 445° C. The thermal decomposition onset temperature ($T_m$) was 539.5° C.

No Tg was observed by DSC analysis in a test range up to 430° C.

Example 9

Preparation of a Polyimide Copolymer having a (BPDA):(DADE):(PMDA):(DABz):(DAT) Molar Ratio of 2:2:5:2:3

A procedure similar to that of Example 7 was performed.

A reactor was charged with 2.94 g (10 mmol) of BPDA, 4.0 g (20 mmol) of DADE, 1.5 g of γ-valerolactone, 2.8 g of pyridine, 100 g of NMP, and 35 g of toluene. The reactor was stirred at room temperature, then heated in a silicone bath at 180° C. with stirring at 180 rpm for 1 hour. The mixture was air-cooled and then stirred with 8.73 g (40 mmol) of PMDA, 3.04 g (20 mmol) of DABz, and 75 g of NMP at room temperature for 20 minutes. Then, the mixture was stirred with 2.18 g (10 mmol) of PMDA, 2.94 g (10 mmol) of BPDA, 3.66 g (30 mmol) of DAT and 77 g of NMP at room temperature for 20 minutes, and then heated at 180° C. with stirring at 180 rpm for 4 hours and 15 minutes to give a polyimide solution having a concentration of 10%.

No molecular weight could be determined by GPC analysis.

TG-GTA analysis was performed by heating to 600° C. at a rate of 10° C./min. A weight loss was observed at 458.3° C., and the thermal decomposition onset temperature ($T_m$) was 553.6° C.

No Tg was observed by DSC analysis in a test range up to 430° C.

Example 10

Preparation of a Polyimide Copolymer having a (BTDA):(DADE):(PMDA):(DABz):(DAT) Molar Ratio of 2:2:4:2:2

A procedure similar to that of Example 7 was performed except that benzophenone tetracarboxylic dianhydride (BTDA) was used in place of BPDA.

A reactor was charged with 6.44 g (20 mmol) of BTDA, 8.0 g (40 mmol) of DADE, 1.8 g of γ-valerolactone, 3.6 g of pyridine, 150 g of NMP, and 35 g of toluene. The mixture was stirred at room temperature, then heated at 180° C. with stirring at 180 rpm for 1 hour. The mixture was air-cooled with stirring for 30 minutes, and then stirred with 17.44 g (80 mmol) of PMDA, 6.48 g (40 mmol) of DABz, and 131 g of NMP at room temperature for 30 minutes. Then, 6.44 g (20 mmol) of BTDA, 4.88 g (40 mmol) of DAT, and 100 g of NMP were added and the mixture was heated at 180° C. with stirring at 180 rpm for 3 hours and 25 minutes to give a polyimide solution having a concentration of 10%.

Molecular weight analysis was unsuccessful. Thermal analysis was performed. TGA-GTA analysis was performed by heating to 600° C. A weight loss was observed at 445° C. The thermal decomposition onset temperature ($T_m$) was 536.3° C.

No Tg was observed by DSC analysis in a test range up to 430° C.

The present invention finds a wide range of applications such as medical materials, construction materials, high-temperature members in housewares, substitutes for Teflon™ by capitalizing on the features of the new preparation process, high-performance polymers and low-cost products.

The invention claimed is:

1. A heat-resistant polyimide copolymer soluble in organic polar solvents, consisting of the following four components: biphenyltetracarboxylic dianhydride (BPDA), 4,4'-diaminodiphenyl ether (DADE), pyromellitic dianhydride (PMDA) and 2,4-diaminotoluene (DAT), wherein said heat-resistant polyimide copolymer is a product of a reaction consisting of a first step of producing an oligomer having DADE at both ends of BPDA, then a second step of adding PMDA and DAT to form an imide oligomer having PMDA at both ends, and a third step of adding DAT to polycondense the mixture, and wherein said heat-resistant polyimide copoloymer has a glass transition temperature of 430° C. or more.

2. The heat-resistant polyimide copolymer of claim 1, wherein the molar ratio of (BPDA):(DADE):(PMDA):(DAT) is 2:2:m:m, wherein m is an integer of 3, 4 or 5.

3. A process for producing a heat-resistant polyimide copolymer soluble in organic polar solvents and having a glass transition temperature of 430° C. or more, said heat-resistant polyimide copolymer being represented by the following formula,

{(PMDA-DAT-BPDA)(DADE-BPDA-DADE)
(PMDA-DAT-PMDA)-DAT}$_n$ said process consisting of:
(a) a first step of reacting biphenyltetracarboxylic dianhydride (1 molar equivalent) and 4,4'-diaminodiphenyl ether (DADE) (2 molar equivalents) in an organic polar solvent in the presence of a catalyst at 160-200° C. to produce an oligomer having DADE at both ends,
(b) a second step of adding pyromellitic dianhydride (PMDA) (3 molar equivalents), biphenyltetracarboxylic dianhydride (1 molar equivalent), and 2,4-diaminotoluene (2 molar equivalents), and stirring and dissolving the mixture to form an imide oligomer having PMDA at both ends, and
(c) a third step of adding 2,4-diaminotoluene (1 molar equivalent) and heating the mixture to polycondense it, thereby synthesizing said heat-resistant polyimide copolymer.

4. A process for producing a heat-resistant polyimide copolymer soluble in organic polar solvents and having a glass transition temperature of 430° C. or more, said heat-resistant polyimide copolymer being represented by the following formula,

{(PMDA-DAT-PMDA)(DADE-BPDA-DADE)
(PMDA-DAT-PMDA)(DAT-BPDA-DAT)}$_n$, said process consisting of:
(a) a first step of reacting biphenyltetracarboxylic dianhydride (1 molar equivalent) and 4,4'-diaminodiphenyl ether (DADE) (2 molar equivalents) in an organic polar solvent in the presence of a catalyst at 160-200° C. to produce an oligomer having DADE at both ends,
(b) a second step of adding pyromellitic dianhydride (PMDA) (4 molar equivalents) and 2,4-diaminotoluene (2 molar equivalents), and stirring and dissolving the mixture to form an imide oligomer having PMDA at both ends, and
(c) a third step of adding biphenyltetracarboxylic dianhydride (1 molar equivalent) and 2,4-diaminotoluene (2 molar equivalents), and heating the mixture to polycondense it, thereby synthesizing said heat-resistant polyimide copolymer.

5. A process for preparing a heat-resistant polyimide copolymer soluble in organic polar solvents and having a glass transition temperature of 430° C. or more, consisting of:
(a) a first step of reacting biphenyltetracarboxylic dianhydride (1 molar equivalent) and 4,4'-diaminodiphenyl ether (DADE) (2 molar equivalents) in an organic polar solvent in the presence of a catalyst at 160-200° C. to produce an oligomer having DADE at both ends,
(b) a second step of adding pyromellitic dianhydride (PMDA) (4 molar equivalents) and 2,4-diaminotoluene (2 molar equivalents), and stirring and dissolving the mixture to form an imide oligomer having PMDA at both ends, and
(c) a third step of adding biphenyltetracarboxylic dianhydride (1 molar equivalent), pyromellitic dianhydride (1 molar equivalent), and 2,4-diaminotoluene (3 molar equivalents), and heating the mixture to polycondense it, thereby synthesizing said heat-resistant polyimide copolymer.

6. The process of claim 3, 4, or 5, wherein the polycondensation reaction comprises heating the mixture at 160-200° C. with stirring in a solvent consisting of N-methylpyrrolidone, sulfolane, dimethylacetamide or dimethylformamide in the presence of small amounts of a catalyst system consisting of γ-valerolactone and pyridine or γ-valerolactone and N-methylmorpholine, and adding toluene into the solvent to remove water by azeotropic distillation with toluene, thereby producing a solvent-soluble polyimide copolymer.

7. A heat-resistant polyimide copolymer soluble in organic polar solvents, consisting of the following four components: benzophenone tetracarboxylic dianhydride (BTDA), 4,4'-diaminodiphenyl ether (DADE), pyromellitic dianhydride (PMDA) and 2,4-diaminotoluene (DAT), wherein said heat-resistant polyimide copolymer is a product of a reaction consisting of a first step of producing an oligomer having DADE at both ends of BTDA, then a second step of adding PMDA and DAT to form an imide oligomer having PMDA at both ends, and a third step of adding DAT to polycondense the mixture, and wherein said heat-resistant polyimide copolymer has a glass transition temperature of 430° C. or more.

8. The heat-resistant polyimide copolymer of claim 7, wherein the molar ratio of (BTDA):(DADE):(PMDA):(DAT) is 2:2:m:m, wherein m is an integer of 3, 4 or 5.

9. A process for producing a heat-resistant polyimide copolymer soluble in organic polar solvents and having a glass transition temperature of 430° C. or more, said heat-resistant polyimide copolymer being represented by the following formula,

{(PMDA-DAT-BTDA)(DADE-BTDA-DADE)
(PMDA-DAT-PMDA)(DAT)}$_n$, said process consisting of:
(a) a first step of reacting benzophenone tetracarboxylic dianhydride (1 molar equivalent) and 4,4'-diaminodiphenyl ether (DADE) (2 molar equivalents) in an organic polar solvent in the presence of a catalyst at 160-200° C. to produce an oligomer having DADE at both ends,
(b) a second step of adding pyromellitic dianhydride (PMDA) (3 molar equivalents), benzophenone tetracarboxylic dianhydride (1 molar equivalent), and 2,4-diaminotoluene (2 molar equivalents), and stirring and dissolving the mixture to form an imide oligomer having PMDA at both ends, and
(c) a third step of adding 2,4-diaminotoluene (1 molar equivalent) and heating the mixture to polycondense it, thereby synthesizing said heat-resistant polyimide copolymer.

10. A process for producing a heat-resistant polyimide copolymer soluble in organic polar solvents and having a glass transition temperature of 430° C. or more, said heat-resistant polyimide copolymer being represented by the following formula, {(PMDA-DAT-PMDA)(DADE-BTDA-DADE)(PMDA-DAT-PMDA)(DAT-BTDA-DAT)}, said process consisting of:
(a) a first step of reacting benzophenone tetracarboxylic dianhydride (1 molar equivalent) and 4,4'-diaminodiphenyl ether (DADE) (2 molar equivalents) in an organic polar solvent in the presence of a catalyst at 160-200° C. to produce an oligomer having DADE at both ends,
(b) a second step of adding pyromellitic dianhydride (PMDA) (4 molar equivalents) and 2,4-diaminotoluene (2 molar equivalents), and stirring and dissolving the mixture to form an imide oligomer having PMDA at both ends, and
(c) a third step of adding benzophenone tetracarboxylic dianhydride (1 molar equivalent) and 2,4-diaminotoluene (2 molar equivalents), and heating the mixture to polycondense it, thereby synthesizing said heat-resistant polyimide copolymer.

11. A process for producing a heat-resistant polyimide copolymer soluble in organic polar solvents and having a glass transition temperature of 430° C. or more, consisting of:
(a) a first step of reacting benzophenone tetracarboxylic dianhydride (1 molar equivalent) and 4,4'-diaminodiphenyl ether (DADE) (2 molar equivalents) in an organic polar solvent in the presence of a catalyst at 160-200° C. to produce an oligomer having DADE at both ends,
(b) a second step of adding pyromellitic dianhydride (PMDA) (4 molar equivalents) and 2,4-diaminotoluene (2 molar equivalents), and stirring and dissolving the mixture to form an imide oligomer having PMDA at both ends, and
(c) a third step of adding benzophenone tetracarboxylic dianhydride (1 molar equivalent), pyromellitic dianhydride (1 molar equivalent), and 2,4-diaminotoluene (3 molar equivalents), and heating the mixture to polycondense it, thereby synthesizing said heat-resistant polyimide copolymer.

* * * * *

UNITED STATES PATENT AND TRADEMARK OFFICE
CERTIFICATE OF CORRECTION

| | | |
|---|---|---|
| PATENT NO. | : 8,742,031 B2 | Page 1 of 1 |
| APPLICATION NO. | : 12/594523 | |
| DATED | : June 3, 2014 | |
| INVENTOR(S) | : Hiroshi Itatani | |

It is certified that error appears in the above-identified patent and that said Letters Patent is hereby corrected as shown below:

In the Claims:

Column 13, Line 32, Claim 1, delete "copoloymer" and insert -- copolymer --

Signed and Sealed this
Sixteenth Day of September, 2014

Michelle K. Lee
*Deputy Director of the United States Patent and Trademark Office*